Oct. 1, 1940.  R. H. SHENK  2,216,300
INTERCEPTOR
Filed Nov. 5, 1937
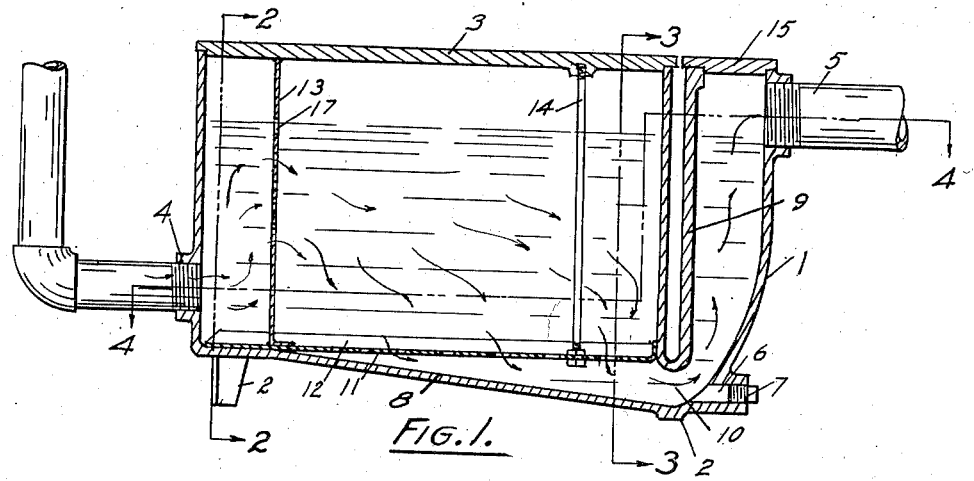
FIG. 1.
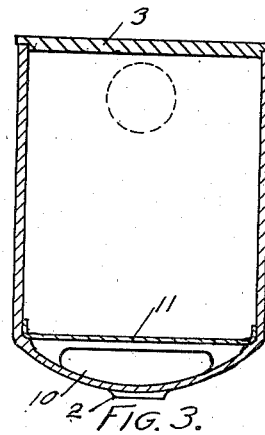
FIG. 2.
FIG. 3.
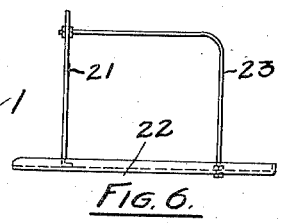
FIG. 6.
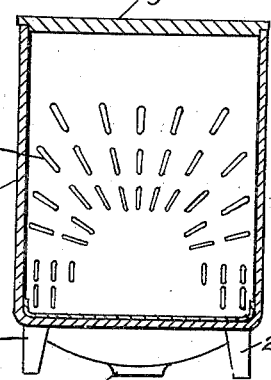
FIG. 5.
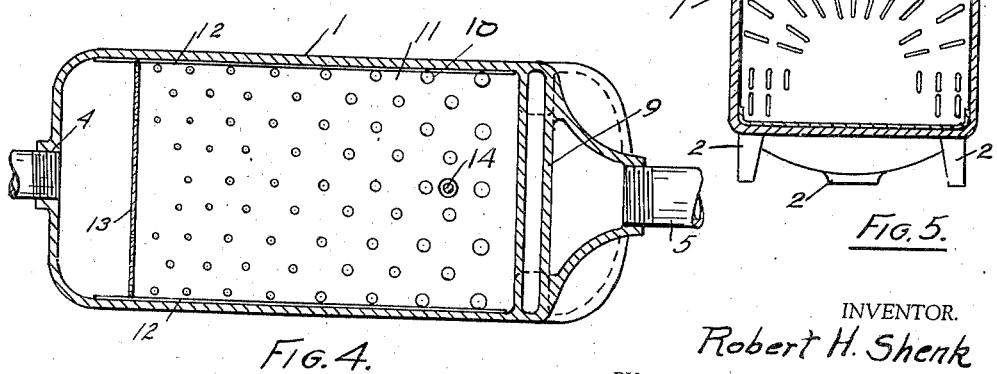
FIG. 4.
INVENTOR.
Robert H. Shenk
BY
Florian G. Miller
ATTORNEY.

Patented Oct. 1, 1940

2,216,300

UNITED STATES PATENT OFFICE 2,216,300

INTERCEPTOR

Robert H. Shenk, Erie, Pa., assignor to J. A. Zurn Manufacturing Company, Erie, Pa., a corporation of Pennsylvania Application November 5, 1937, Serial No. 172,979

4 Claims. (Cl. 210—56)

This invention relates generally to interceptors for solids in a drainage system and more particulary to grease interceptors for a drainage line.

All devices of this character made according to the prior art, and with which I am familiar, permitted the waste water to pass through the grease interceptor at a high velocity resulting in the passage of the grease directly through the interceptor without eliminating any appreciable amount of grease from the waste water. The constructions of many of these prior interceptors were costly both in initial cost and in operation. Interceptors must be necessarily efficient in order to be of practical value. The grease also clings to the side of the drainage pipes and causes clogging thereof. Grease which reaches the sewage plant retards the reactions of the chemicals used for sewage disposal.

It is, accordingly, an object of this invention to overcome the above and other defects in grease interceptors and the principal object of my invention is to provide a grease interceptor which is simple in construction, efficient in operation, and cheap in cost and maintenance.

Another object of my invention is to provide a grease interceptor for a drain line which permits easy removal of intercepted grease and other solids.

Another object of my invention is to provide a grease interceptor which intercepts the full grease content of the waste water passing through the drain.

Another object of my invention is to provide a grease interceptor which controls the velocity of the water passing therethrough.

Another object of my invention is to provide a grease interceptor which has means for equalizing the pressure of the waste water passing therethrough.

Other objects of my invention will become evident from the following detailed description, taken in conjunction with the accompanying drawing, in which Fig. 1 is a side elevational view in section of my novel grease interceptor.

Fig. 2 is a view taken on the line 2—2 of Fig. 1.

Fig. 3 is a view taken on the line 3—3 of Fig. 1.

Fig. 4 is a view taken on the line 4—4 of Fig. 1.

Fig. 5 is a sectional view showing the vertical basket portion with slots.

Fig. 6 is a side elevational view of a basket which is separate from the cover of the interceptor and which has a handle for removal thereof.

Referring to the drawing, Fig. 1 shows a casing 1 having legs 2 and a cover 3. An inlet 4 enters the casing at one end near the lower portion thereof and an outlet 5 discharges the fluid from the casing 1. A drain aperture 6 having a drain plug 7 is disposed in the bottom portion of the casing 1 for removing the sediment, solids, grease, and the like which settle in the declining bottom 8 of the casing 1. A baffle wall 9 is disposed traversely of the casing 1 and an aperture 10 in the lower portion thereof permits the flow of fluid thereunder to the outlet 5.

A perforated basket depends from the cover 3 and comprises a perforated horizontal baffle plate 11 having flanged sides 12 and a perforated vertical baffle plate 13 disposed in the path of the incoming water. A supporting member 14 depends from the cover 3 and supports one end of the bottom portion 11. The bottom portion 11 and vertical portion 13 of the basket fit snugly into the casing 1.

Practically no water will seep through between the walls of the casing 1 and the bottom and vertical portions 11 and 13 of the basket. It is evident that the integrally connected basket is removed from the casing 1 when the cover 3 is removed. The cover 3 is so designed that when it is seated on the casing 1, the basket depends therefrom in its operative position in the casing 1. A cleanout cover 15 is provided to clean out the passage leading to the discharge outlet 5.

The vertical baffle plate 13 of the basket has an unperforated portion 16 directly in front of the inlet 4 and the perforations 17 therein increase in size as the distance from the inlet 4 increases in order that pressure of the waste water coming into the casing 1 is equalized in its passage through the interceptor or casing 1. The velocity of the water is greatly retarded upon striking the unperforated portion of the baffle plate 13 in that it must change its direction of flow. Upon passage through the perforated portion of the baffle plate 13 the water pressure becomes practically equalized thereby permitting congelation of the grease in the waste water which rises to the surface of the water in the casing 1. The perforated portions of the baffle plates 11 and 13 separate all solids from the waste water as well as grease and like substances before the water passes to the outlet 5. The horizontal baffle plate 11 separates all grease and other sediment from the waste water which is not separated therefrom by the baffle plate 13. The perforations 18 in the horizontal baffle plate 11 increase in size as the distance from the inlet 4 increases thereby further equalizing the pressure of the water passing through the interceptor. It will be evident that the perforations 17 and 18 in the baffle plates 11 and 13 may be in the form of slots as shown at 19 in Fig. 5. The variation in the size of the perforations 17 and 18 is not absolutely necessary for the successful operation of my novel invention nor is the unperforated portion 16 in the baffle plate 13 necessary for successful operation since very small perforations (not shown) might be provided at this point and produce a similar result. The baffle plate 13 has a portion 20 thereof unperforated in order that grease collected on the surface of the water in the casing 1 is retained and withdrawn when the cover 3 is removed.

In operation, the waste water or like liquid passes into the inlet 1 and strikes the unperforated portion 16 of the baffle plate 13 causing the water to change its direction of flow and thereby greatly retarding its velocity. The water then passes through the perforations 17 in the baffle plate 13 causing an equalization of the pressure of the water and permitting separation of the sediment and grease therefrom and congealment of the grease in the waste water whereby it floats on the surface of the water in the casing 1 and is removed upon removal of the cover 3. A further separation of grease and sediment remaining in the waste water or like liquid takes place when the waste water or other liquid passes through the horizontal baffle plate 11. The portion 20 of the baffle plate 13, which is unperforated, retains the grease on the surface of the water in the casing 1. The grease may have a tendency to clog up the perforations 17 and 18 in the baffle plates 11 and 13 but this can serve to inform the operator to remove the basket for cleaning.

Fig. 6 shows a basket for disposal in the casing 1 of the interceptor which is independent of the cover 3. The vertical and horizontal baffle plates 21 and 22 are positioned in the casing 1 the same as the baffle plates 11 and 13. A handle 23 which is also utilized to support the baffle plates 21 and 22, permits easy removal thereof from the casing 1 to remove the collected grease. Any form of handle may be used.

It will be evident that I have provided an interceptor for grease and other sediment which fully intercepts the grease and other sediment, which is easy to clean, which permits easy removal of collected grease, which is cheap in cost and maintenance, and which provides a means for ascertaining when the interceptor is full of grease or other sediment.

Various changes may be made in the specific embodiment of the present invention without departing from the spirit thereof, or from the scope of the appended claims.

What I claim is:

1. An interceptor for grease and sediment comprising a casing having an inlet and an outlet for liquid, a substantially vertical baffle plate disposed in the path of the liquid entering said casing and having perforations for equalizing the pressure of the liquid passing into said casing and separating solid matter therefrom, said plate having a portion thereof directly adjacent said inlet, unperforated, and a substantially horizontal baffle plate in said casing for further separating solid matter from said matter passing through said casing, and an opening in said casing for removing sediment therefrom.

2. A device of the class described comprising a casing having an inlet and an outlet for liquid, a perforated plate disposed in the path of liquid passing into said casing through said inlet for equalizing the pressure of said liquid passing through said casing thereby permitting increased congealing of grease in said liquid, the upper portion of said plate above the water line of said casing being unperforated to restrain escape of grease on the surface of the water in said casing.

3. An interceptor for grease and sediment comprising a casing having an inlet and an outlet for liquid, a substantially vertical baffle plate disposed in the path of liquid entering said casing and having perforations for equalizing the pressure of the liquid passing into said casing and separating solid matter therefrom, a substantially horizontal perforated baffle plate in said casing for further separating solid matter from said liquid passing through said casing, and a cleanout opening in said casing for removing sediment therefrom.

4. An interceptor as claimed in claim 3 wherein the casing has the bottom portion thereof declining away from the inlet opening to facilitate passage of the sediment to a position where it may be removed from the casing.

ROBERT H. SHENK.